(12) United States Patent
Osterkamp et al.

(10) Patent No.: US 11,468,506 B1
(45) Date of Patent: Oct. 11, 2022

(54) SYSTEMS AND METHODS FOR TOUCHLESS IN-PERSON BANK CUSTOMER SERVICE

(71) Applicant: UIPCO, LLC, San Antonio, TX (US)

(72) Inventors: Bryan J. Osterkamp, New Braunfels, TX (US); Will Kerns Maney, Jr., San Antonio, TX (US); Andre Rene Buentello, San Antonio, TX (US); Mark Paxman Warnick, San Antonio, TX (US); Jose L. Romero, Jr., San Antonio, TX (US); Oscar Roberto Tijerina, San Antonio, TX (US); Sean Carl Mitchem, San Antonio, TX (US); Timothy Blair Chalmers, San Antonio, TX (US); Ruthie D. Lyle, Durham, NC (US); Mitzi Ruiz, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/218,936

(22) Filed: Mar. 31, 2021

Related U.S. Application Data

(60) Provisional application No. 63/002,974, filed on Mar. 31, 2020.

(51) Int. Cl.
  *G06Q 40/02* (2012.01)
  *G06Q 30/00* (2012.01)

(52) U.S. Cl.
  CPC .......... *G06Q 40/02* (2013.01); *G06Q 30/016* (2013.01)

(58) Field of Classification Search
  USPC ...................................... 705/1.1, 35
  See application file for complete search history.

(56) References Cited

U.S. PATENT DOCUMENTS

| | | | | |
|---|---|---|---|---|
| 9,373,112 | B1* | 6/2016 | Henderson | G06Q 30/0201 |
| 2012/0158934 | A1* | 6/2012 | Xiao | G06Q 30/02 |
| | | | | 709/223 |
| 2014/0358727 | A1* | 12/2014 | Shannon | G06Q 30/0613 |
| | | | | 705/26.41 |
| 2015/0324772 | A1* | 11/2015 | Sarris | G06Q 30/016 |
| | | | | 705/42 |
| 2016/0132847 | A1* | 5/2016 | Sarris | G06Q 20/1085 |
| | | | | 705/42 |
| 2018/0033018 | A1* | 2/2018 | Opalka | G06Q 30/016 |

FOREIGN PATENT DOCUMENTS

WO  WO-2012152088 A1 * 11/2012 ............. G07C 11/00

* cited by examiner

*Primary Examiner* — William E Rankins
(74) *Attorney, Agent, or Firm* — Plumsea Law Group, LLC

(57) ABSTRACT

The present disclosure relates to a system, method, and mobile computing device apparatus for detecting the physical presence of a bank customer at a bank branch, and delivering an enhanced customer service experience by anticipating the bank customer's needs. Detection of the bank customer through visual data such as facial recognition, or electronic data such as medium range electronic communication networks to the customer's mobile computing device, allow a bank to retrieve relevant customer profile and customer transaction history data and use that data to deliver communications to the customer even before the customer speaks to a bank teller.

13 Claims, 7 Drawing Sheets

SYSTEMS AND METHODS FOR TOUCHLESS IN-PERSON BANK CUSTOMER SERVICE

CROSS-REFERENCE TO RELATED APPLICATIONS

This application claims the benefit of Provisional Patent Application No. 63/002,974 filed Mar. 31, 2020 and titled "Systems and Methods for Touchless In-Person Bank Customer Service", which is incorporated by reference herein in its entirety.

TECHNICAL FIELD

The present disclosure relates to the field of hardware systems, and related methods and smartphone applications, that enable a bank to deliver customer service through the detection and anticipation of customer needs as those needs relate to banking transactions conducted when the customer is physically located in a bank branch location.

BACKGROUND

Many well-known customer service systems are known in the art of financial transactions, financial management, and banking. Many banks offer their customers smartphone applications that allow customers to conduct certain types of business without the need to visit a bank branch or interact with a bank customer service representative. For example, many bank smartphone apps allow features such as remote deposit capture, transfer of money between accounts, or bill pay, among others. Banks also necessarily develop and deploy the backend server side computer hardware systems that allow customers to use these smartphone apps.

However, even in the modern era with such smartphone conveniences, certain types of bank transactions often take place in-person at a bank branch. For example, certain customers may prefer to conduct banking business face-to-face with a bank teller customer service representative in order to feel better assured that their money is safe. Further, certain types of banking transactions must necessarily be conducted when a customer is physically located at a bank branch—such as deposits of cash, or transactions where legal requirements necessitate showing a government issued identification. In such instances, some customers may feel that the need to personally visit the bank location is an unnecessarily time consuming or otherwise burdensome activity. In particular, bank branches may sometimes be plagued by long customer lines, a shortage of bank personnel who can appropriately address the customer's specific needs, or other complications.

Accordingly, there is a need in the art for computer systems, mobile computing devices, and methods that addresses the shortcomings discussed above.

SUMMARY OF THE DISCLOSURE

In one aspect, the disclosure provides a system for delivering enhanced customer service by detecting the physical proximity of a bank customer, comprising: a sensor; and at least one computing device, the computing device including a processor and being in electronic communication with the sensor; wherein the computing device is configured to perform the steps of: (1) receiving a customer proximity input from the sensor, the customer proximity input including data descriptive of a physical presence of a customer who is located in a geographic proximity of a bank; (2) comparing the customer proximity input to a customer profile database to identify a customer profile associated with the customer; (3) sending a check-in prompt to the customer; the check-in prompt being descriptive of one or more available banking transactions that are available to the customer; (4) receiving a check-in input from the customer, the check-in input including data descriptive of one or more selected banking transactions selected by the customer in response to the check-in prompt; and (5) sending a customer service output to the customer, the customer service output including data associated with an action to be taken by at least one of the customer and the bank in order to complete the one or more selected banking transactions.

In another aspect, the disclosure provides a method comprising: (1) detecting the physical presence of a bank customer who is located within a geographic region of a bank through an interaction between a sensor and an identifying aspect associated with the bank customer; (2) identifying a customer profile associated with the bank customer in a customer profile database, based on data received from the sensor; (3) querying a customer transaction history database by comparing the customer profile to the customer transaction history database; (4) recalling customer transaction history data associated with the customer profile in the customer transaction history database; (5) identifying a preferred banking transaction among a plurality of available banking transactions, the preferred banking transaction being an available banking transaction that is likely to address the bank customer's reasons for visiting the bank, wherein the preferred banking transaction is identified based on the customer transaction history data including one or more of a pending transaction, a previously failed transaction, and a pattern of previous transactions over time; (6) sending a check-in prompt to the bank customer; the check-in prompt including data descriptive of the preferred banking transaction; (7) receiving a check-in input from the bank customer in response to the check-in prompt, the check-in input including data descriptive of a selected banking transaction; the selected banking transaction being at least one of the preferred banking transaction and other available banking transactions; and (8) sending a customer service output to the bank customer, the customer service output including data associated with an action to be taken by at least one of the bank customer and a bank representative in order to complete the selected banking transaction.

Finally, in another aspect, this disclosure provides a mobile computing device, configured to: (1) send identifying electronic information to a sensor located within a geographic vicinity of a bank, the identifying electronic information being associated with a bank customer associated with the mobile computing device; (2) receive a check-in prompt; the check-in prompt being descriptive of one or more available banking transactions that are available to the bank customer; (3) send a check-in output, the check-in output including data descriptive of one or more selected banking transactions selected by the bank customer in response to the check-in prompt; and (4) receive a customer service input, the customer service input including data associated with an action to be taken by at least one of the bank customer and the bank in order to complete the one or more selected banking transactions.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted. Further, unless otherwise specified, any step in a method or functioning of a system may take place in any relative order in relation to any other step described herein.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Systems to provide enhanced customer service at a bank branch location are broadly disclosed that identify bank customers, guide customers, and anticipate bank customer needs. These systems may automatically detect the physical presence of a bank customer who is in proximity to the geographic location of a bank branch. Related methods and apparatuses, such a mobile computing device (aka a smartphone), are also disclosed—as well as a non-transitory computer readable storage medium including instructions which, when executed by one or more computing devices, carry out a method for providing enhanced customer service to bank customers in a bank branch.

Figure 1:
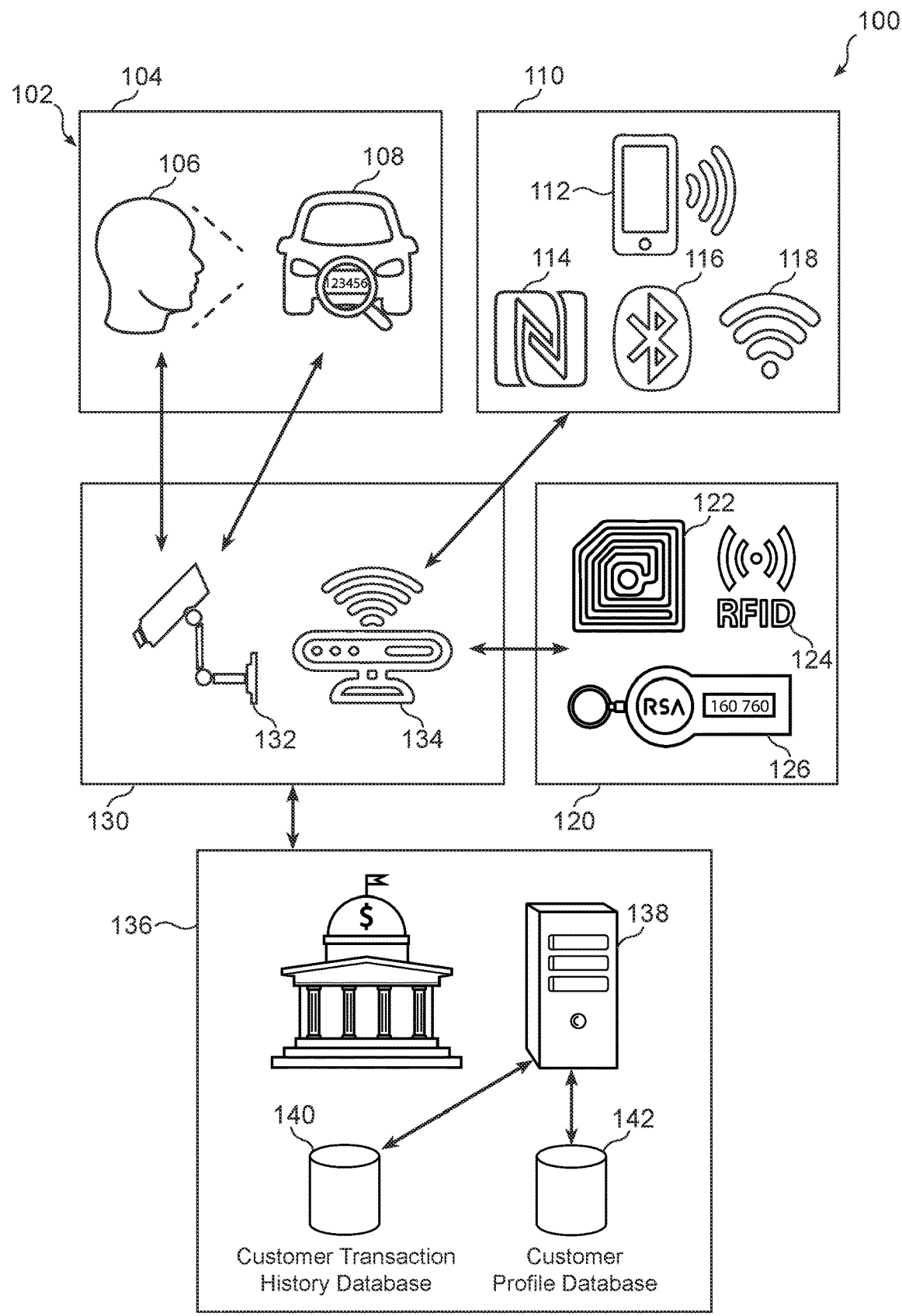
FIG. 1 is a diagram of a system that includes several pieces of hardware in electronic communication with each other.

Most broadly, as shown in FIG. 1, a system 100 for delivering enhanced customer service by detecting the physical proximity of a bank customer may include a sensor 130 and at least one computing device 138. Computing device 138 may include a processor and may be in electronic communication with the sensor 130. System 100 may include several components: customer component 102, sensor 130, and bank component 136. Generally, sensor 130 interacts with one or more aspects of customer component 102, and then electronically communicates with bank component 136 that includes computing device 138. In this way, system 100 may identify a bank customer through an interaction between sensor 130 and an identifying aspect of a customer 102. Computing device 138 may then recall information from a customer profile database 142 and a customer transaction history database 140, as well as write information to these databases.

Customer component 102 may include several different categories (104, 110, 120) of identifying aspects associated with a bank customer. Generally, customer component 102 may include any type of aspect that would allow a sensor to uniquely identify a specific bank customer. This may broadly include visual data such as photographic data or video data, or electronic data such as any of a variety of unique electronic identifiers associated with one or more pieces of hardware that may be held or carried by a bank customer.

For example, customer visual aspects 104 may include biometric data 106 that is identified from visual data associated with one or more bodily aspects of a bank customer's physical person. Biometric data may include facial recognition data, gait recognition data, ear shape data, iris or retina recognition data, and others. In some embodiments, a purpose of sensor 130 may be to identify a bank customer from a moderate distance as the bank customer comes within a geographic proximity of a bank branch, as further described with respect to FIG. 4 below. Accordingly, customer visual aspects 104 may therefore include any of a variety of biometric data that may be captured from a distance—without direct physical contact between the bank customer and a sensor 130.

Customer visual aspects 104 may also encompass other physical features that may be captured by visual image data—such as a license plate 108 of a motor vehicle that is owned by, or otherwise associated with, a bank customer.

Generally, customer visual aspects 104 may be detected by a sensor 130 that is a camera 132. Camera 132 may generally be any type of known camera that is capable of capturing image or video data with enough specificity and resolution as to identify a customer visual aspect 104 as discussed above.

Customer component 102 may further include customer mobile computing device aspect 110. Customer mobile computing device aspect 110 may include a variety of identifying electronic data as communicated by a customer's mobile computing device 112. The particular data making up the identifying electronic data associated with a customer mobile computing device aspect 110 may be any of a variety of identifying data, such as: a password and login, a unique hardware identifier associated with the customer's mobile computing device 112, biometric data entered into the customer's mobile computing device 112 and stored therein such as fingerprint data or voice signature data, or others.

The identifying electronic data may be communicated to sensor 130 by a customer's mobile computing device 112 in any of a variety of ways. For example, a customer's mobile computing device 112 may transmit electronic data to a nearby sensor 130 through one or more communication protocols. These protocols may include near field communication (NFC) 114, Bluetooth 116, or Wi-Fi 118. Generally, system 100 may be configured to detect the physical proximity of a bank customer to a geographic region of a bank branch. In some embodiments, this may therefore be achieved by the use of such medium-range or short-rage mobile computing device electronic communication protocols as just mentioned.

In other embodiments, however, identifying electronic data may be associated with hardware other than customer mobile computing device 112. Customer non-smartphone aspect 120 may broadly encompass any hardware that can engage in electronic communication with a sensor 130 that is not a mobile computing device. For example, customer non-smartphone aspect 120 may include a radio frequency identification ("RFID") tag 122. RFID tag 122 may be carried by the bank customer on their person, such as in their wallet. RFID 122 as shown may be a passive RFID device, that does not include a power source—and is instead activated by electromagnetic radiation originating from a sensor 130. Alternatively, customer non-smartphone aspect 120 may be an active RFID device 124, which includes its own power source. Active RFID device 124 may be incorporated into hardware such as a bank security token 126.

Bank security token 126 may be any physical device capable of communicating identifying electronic data to a sensor 130. Security token 126 may be configured to communicate electronically via any of a variety of protocols, including: passive RFID 122, active RFID 124, near field communication, Bluetooth, or others. Generally, security token 126 may be conveniently sized and shaped so that a bank customer may carry it on their person. In this way, a bank customer who is carrying security token 126 will cause security token 126 to interact with a sensor 130 when the bank customer is physically located in the geographic location of the sensor 130—and the sensor may be physically located within a geographic region of a bank branch.

In embodiments where customer mobile computing device aspect 110 or customer non-smartphone aspect 120 may be used to identify the bank customer, then sensor 130 may comprise an electronic sensor 134 that is configured to receive one or more types of identifying electronic data associated with a bank customer. Sensor 134 may be configured to send and/or receive data according to any of the electronic communication protocols mentioned above.

In accordance with all of the above, sensor 130 may interact with one or more identifying aspects of a customer 102. Sensor 130 may then be in electronic communication with bank component 136 of system 100. Bank component 136 may include at least one general computing device 138. Computing device 138 may thus receive an input from sensor 130, and then proceed to process that input and perform certain actions. Computing device 138 may also be in electronic communication with a customer profile database 142 and a customer transaction history database 140, from which it draws data to be used to deliver enhanced customer service to the bank customer.

Figure 2:
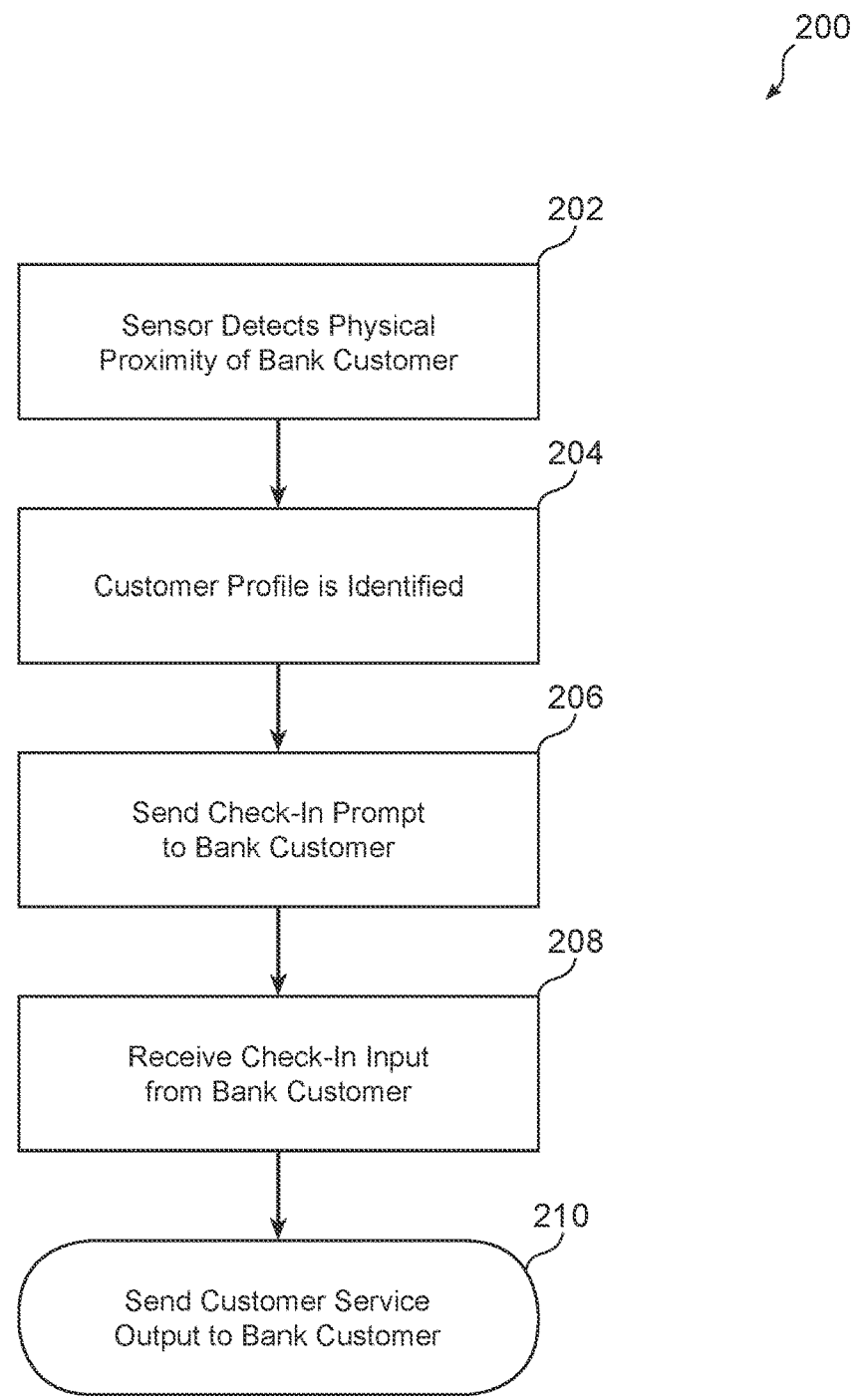
FIG. 2 shows a flowchart of a first process in accordance with this disclosure.

Namely, FIG. 2 shows a flowchart of a first embodiment of a process by which system 100 delivers enhanced customer service to a bank customer. Process 200 may be performed by system 100 as shown in FIG. 1. In particular, FIG. 2 shows greater detail regarding the actions performed by computing device 138.

First, process 200 begins with step 202 wherein a sensor 130 detects the physical proximity of a bank customer. As discussed above, this may occur by (for example) a camera 132 receiving and processing image data or by an electronic sensor 143 receiving electronic data. Sensor 130 thereby generates a customer proximity input, the customer proximity input may include data that is descriptive of a physical presence of a bank customer who is located in the geographic vicinity of a bank branch. The customer proximity input is then received by computing device 138.

Computing device 138 next compares the customer proximity input to a customer profile database 142 to identify a customer profile associated with the bank customer at step 204. Step 204 thereby verifies the identity of the bank customer, and allows the computing device to recall data from the customer profile database 142 associated with the specific customer profile identified in order to take additional actions by using that data.

Namely, the computing device 138 next at step 206 sends a check-in prompt to the bank customer. This check-in prompt may be descriptive of one or more available banking transactions that are available for the bank customer to engage in. This step of the process 200 as undertaken by system 100 allows system 100 to communicate to the bank customer, informing the bank customer of the slate of several options for banking transactions and conveniently allowing the bank customer to select from the pre-made list of choices.

Selection of the one or more available banking transactions from a universe of all possible banking transactions may be done by the computing device 138 by analyzing the customer profile identified in step 204. Namely, computing device 138 may recall from customer profile database 142 information about the bank customer's accounts at the bank as stored in the customer profile. Computing device 138 may then automatically identify possible banking transactions using one or more algorithmic criteria, and then communicate these one or more available banking transactions to the customer by sending the check-in prompt.

Sending of the check-in prompt may generally take place through any of a variety of electronic communication means. For example, in one embodiment, a self-service kiosk at the bank may display the check-in prompt to the bank customer. In such an embodiment, the sensor 130 may be a part of the kiosk—such that the kiosk identifies and verifies the customer before displaying any sensitive banking information.

However, in another embodiment, the check-in prompt may be sent to a mobile computing device 112 associated with the bank customer. In this embodiment, the customer profile identified in step 204 from the customer profile database 142 may include data descriptive of the association between the bank customer and the bank customer's mobile computing device. Namely, identification of the mobile computing device phone number for texting purposes—or identification of the bank customer's user name and smartphone app profile in order to send app notifications.

At step 208, process 200 performed by system 100 next receives a check-in input from the bank customer in response to the check-in prompt. The check-in input may include data descriptive of one or more selected bank transactions, as selected by the customer from the one or more available bank transactions contained in the check-in prompt. In this way, the customer expresses the customer's purpose for visiting the bank branch. This may allow the customer and the bank to both streamline the time the bank customer spends in the bank branch, by allowing the bank customer to express their goals and needs even before talking to a bank teller or other live bank customer service representative.

As discussed above, in some embodiments, the check-in prompt may be communicated to a mobile computing device 112 associated with the bank customer. In such embodiments, step 208 may therefore include receiving the check-in input back from the mobile computing device 112 associated with the bank customer.

Finally, at step 210 process 200 concludes by sending a customer service output to the bank customer. The customer service output may include data associated with an action to be taken by at least one of the bank customer and the bank, in order to complete the one or more selected banking transactions. A wide range of types of data, descriptive of a variety of actions, may be included in the customer service output. For example, the customer service output may direct the bank customer to speak with a specific customer service representative at the bank branch, or to wait in a lounge area while a bank representative takes further action to complete the selected banking transactions. Namely, the customer service output may notify the customer to take any seat in the bank branch and a customer service representative will be with them shortly, or the customer service output may notify the customer to proceed to a specific room or office that has been reserved for the customer's appointment. In particular embodiments, the customer service output may be sent to the mobile computing device 112 associated with the bank customer—thereby allowing the bank customer to easily and quickly receive the information and direction, so that they might efficiently conduct their banking business.

In this way, system 100 communicates to the bank customer in such a way that automatically detects the customer's presence when the customer approaches the bank branch, asks the customer which banking transaction(s) they wish to conduct, and directs the customer and/or the bank to take action to fulfil the customer's needs. This level of enhanced customer service therefore both improves customer satisfaction, and may also help reduce costs to the bank by more efficiently deploying bank branch resources.

Figure 3:
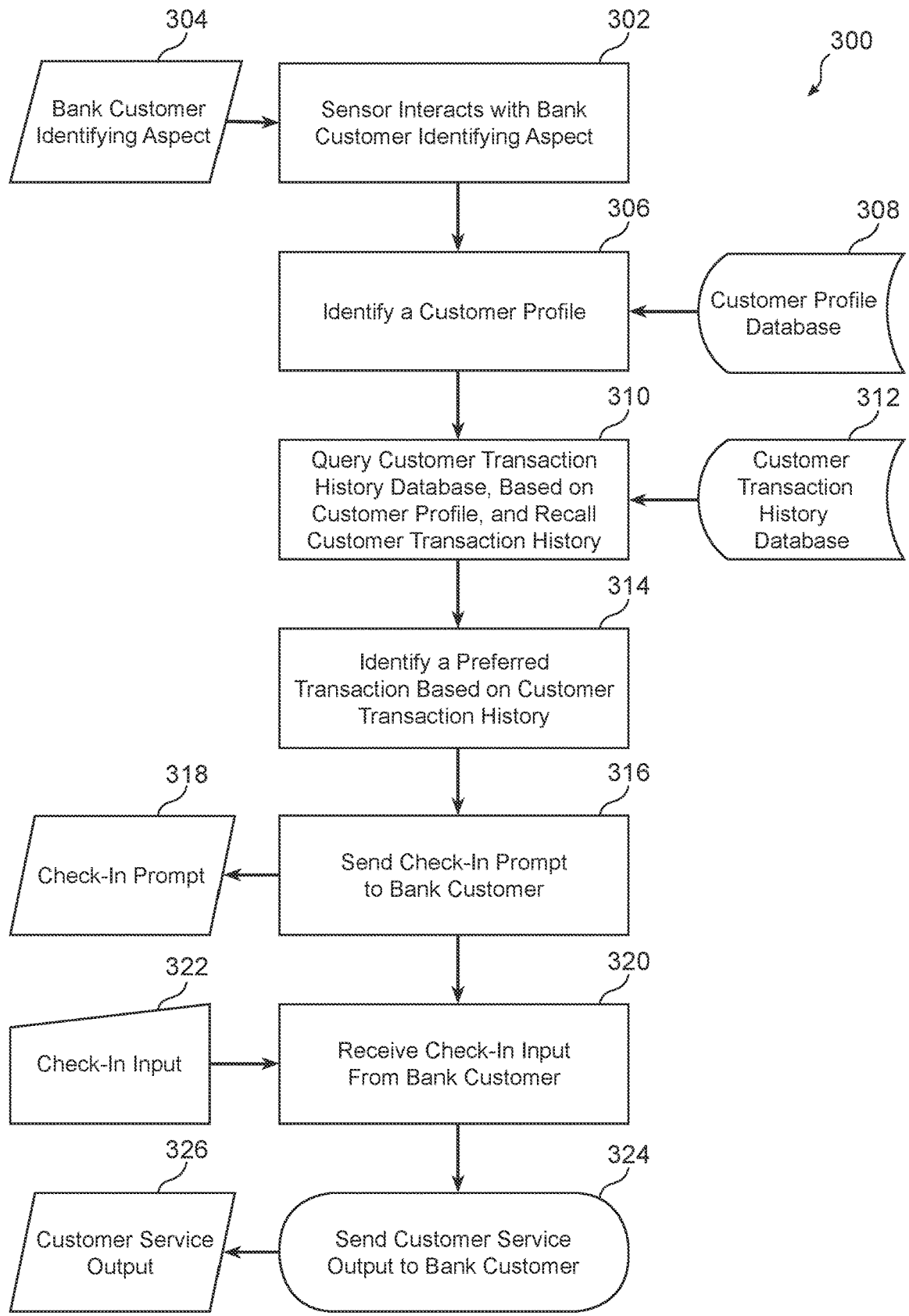
FIG. 3 shows a flowchart of a second process in accordance with this disclosure.

FIG. 3 shows a flowchart of a second embodiment of a process 300 performed by system 100. In this embodiment, process 300 includes some aspects which may be substantially the same as in process 200 described above—while also including additional steps and actions.

First, process 300 begins at step 302 by detecting the physical presence of a bank customer who is located within a geographic region of a bank branch, through an interaction between a sensor 130 and an identifying aspect 304 associated with the bank customer. Identifying aspect 304 may correspond to visual data 104, mobile computing device based electronic data 110, or non-smartphone electronic data 120 as shown in FIG. 1.

Next, method 300 may include step 306 of identifying a customer profile associated with the bank customer. Namely, step 306 may identify a customer profile from customer profile database 308 based on data received from the sensor in step 302. Customer profile database 308 may correspond to customer profile database 142 as shown in FIG. 1, and may generally include a multitude of customer profiles each of which include data descriptive of a bank customer and related information about the bank customer's bank accounts and other associated information.

In step 310 method 300 may include querying a customer transaction history database 312. Querying the customer transaction history database 312 may occur by comparing the customer profile identified in step 306 to the customer transaction history database 312. In this way, method 300 may recall customer transaction history data associated with the customer profile from the customer transaction history database 312.

Customer transaction history database 312 may include a history of all or some previous banking transactions taken by each customer of the bank, with associated information such as dates, amounts, and the nature of the transaction. The customer transaction history database may also include data descriptive of a status of the previous banking transactions: whether they were completed successfully, are still currently pending awaiting some further action, or whether the transaction failed due to unsuccessful completion of the transaction.

Next, at step 314, process 300 may include identifying a preferred banking transaction among a plurality of available banking transactions that is likely to address the bank customer's reason(s) for visiting the bank branch. Namely, computing device 138 engages in an automatic analysis of the customer's transaction history that was recalled from customer transaction history database 312 in step 310. This analysis may be done using any of variety of techniques, such as: pre-programmed analytical models, machine learning based on feedback from customers on previously identified preferred banking transaction, or other types of artificial intelligence.

In particular embodiments, step 314 of process 300 may include identifying the preferred banking transaction from among one or more of a pending transaction, a previously failed transaction, and a pattern of previous transactions over time as included in the customer transaction history data that was recalled in step 310. In this embodiment, these particular types of transactions may be likely to be the reason the banking customer has chosen to visit the bank branch. For example, a pending transaction may be a transaction that requires an in-person action such as signing a document with a notary. Alternatively, a previously failed transaction may be a complex transaction for which the bank customer would like to receive in-person help from a bank representative. A pattern of previous transactions over time may show a routine business operation that the customer engages in on a regular basis. In this way, process 300 may draw on relevant data to anticipate the customer's banking needs, so that process 300 may subsequently deliver enhanced customer service to the customer based on that anticipation.

Namely, at step 316 process 300 next sends a check-in prompt 318 to the bank customer. In the embodiment shown in FIG. 3, check-in prompt 318 may include data descriptive of the preferred banking transaction as identified in step 314. Process 300 therefore communicates to the bank customer the anticipation of the customer's needs, while also nonetheless allowing the customer to make other selections on the check-in prompt other than the identified preferred transaction in case the identification does not match the customer's needs either in part or wholly. Check-in prompt 318 may therefore also include other available banking transactions other than the preferred banking transaction, and may also include an option for the customer to self-identify another reason for their visit to the bank branch.

Next process 300 receives a check-in input 322 back from the bank customer at step 320. The bank customer makes their selection from one or more options presented in the check-in prompt, thereby creating check-in input 322. Computing device 138 receives the check-in input 322 from the customer, in some embodiments from the customer's mobile computing device 112. The check-in input 322 therefore includes data descriptive of a selected banking transaction, where the selected banking transaction may be at least one of the preferred banking transaction and other available banking transactions.

Finally, at step 324 process 300 may include sending a customer service output 326 to the banking customer. Customer service output 326 may include data associated with an action to be taken by at least one of the bank customer and a bank representative, in order to address or complete the selected banking transaction.

In this way, all together, process 300 is therefore carried out by computing device 138 to detect the physical presence of a customer, identify the customer, analyze and predict the customer's likely needs, and then communicate with the customer so that the customer knows their needs will be taken care of. This level of enhanced customer service will therefore better address the customer's banking needs, with efficient use of the bank branch's resources.

Figure 4:
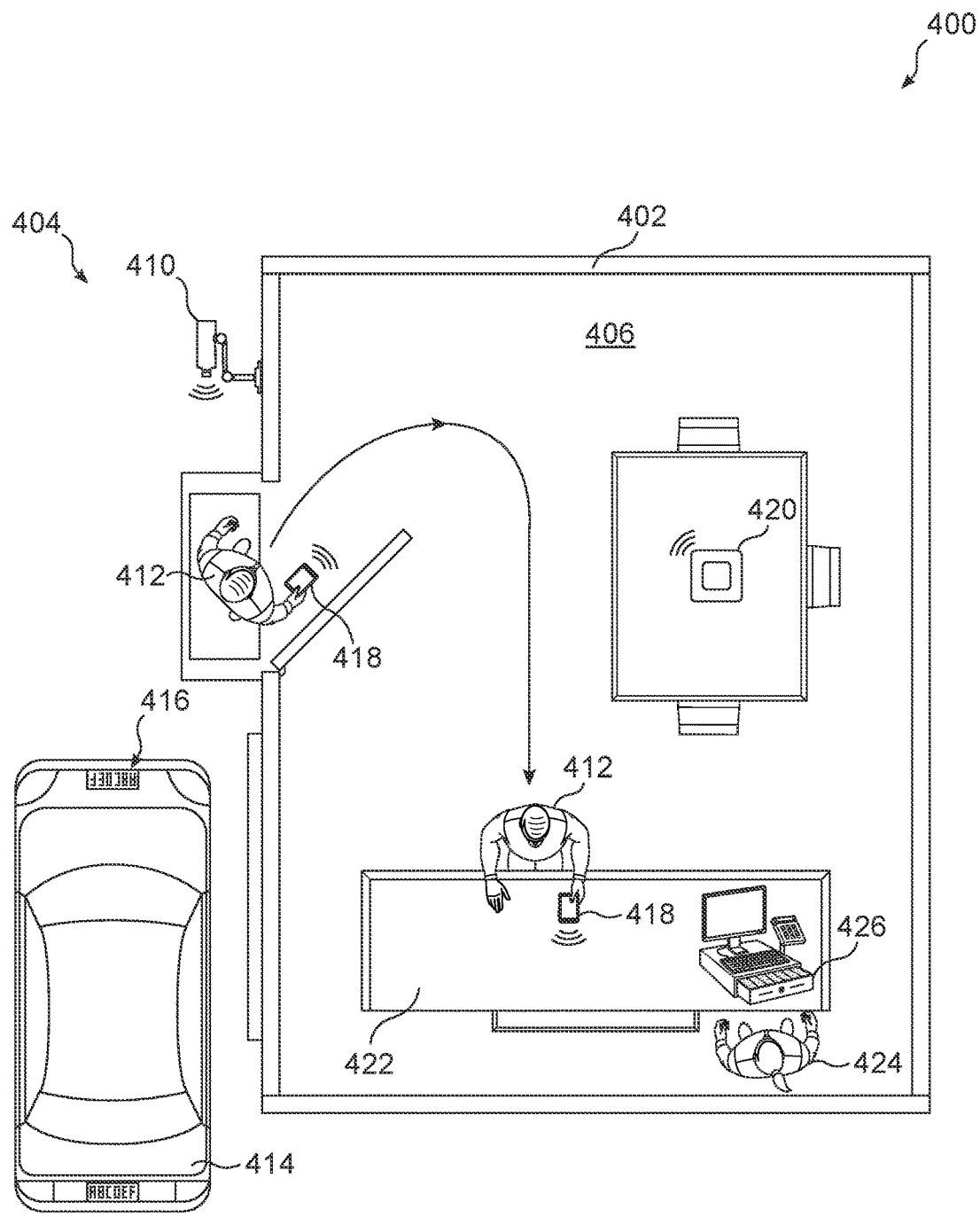
FIG. 4 is a diagram showing a bank building with a customer therein.

FIG. 4 shows a diagram of a customer 412 who is located in the geographic vicinity 400 of a bank branch 402. FIG. 4 therefore shows how a process such as process 200 or process 300 may operate with respect to the bank branch 402. Namely, customer 412 may approach the geographic vicinity 400 of the bank branch 402 and interact with a sensor 410 at an external region 404 of the geographic vicinity 400 of the bank branch 402. Sensor 410 may be physically located in external region 404, so as to be able to detect the customer as they approach the bank branch 402 as early as possible. Sensor 410 may be substantially similar to sensor 132 discussed above, and may be a camera that captures image or video data of one or more visual aspects associated with bank customer 412. Namely, sensor 410 may be a facial recognition scanner, a gait scanner, other biometric sensor, or may capture license plate image data of a license plate 416 from a motor vehicle 414 owned by or otherwise associated with bank customer 412.

FIG. 4 also shows how, in some embodiments, bank branch 402 may include both a first sensor 410 and also a second sensor 420. Second sensor 420 may be an electronic sensor, substantially similar to sensor 134 discussed above, that electronically communicates with bank customer's mobile computing device 418. First sensor 410 may be located in an external region 404 of bank branch geographic vicinity 400, while second sensor 420 may be located in an internal region 406 of bank branch 402. In some embodiments, depending variously on the electronic communication protocol used, second sensor 420 may also be able to interact with bank customer 412 (via bank customer's mobile computing device 418) at a range sufficient to detect and identify the bank customer 412 as they approach the bank branch 402. Alternatively, second sensor 420 may detect bank customer 412 once they are located inside 406 of the bank branch 402.

In various embodiments, first sensor 410 and second sensor 420 may act as alternatives to each other to detect one or more identifying aspects of bank customer 412. However, in other embodiments, first sensor 410 and second sensor 420 may work in conjunction to identify multiple identifying aspects of bank customer 412. Namely, first sensor 410 may interact with a first identifying aspect of bank customer 412 (e.g. facial recognition) while second sensor 420 may interact with a second identifying aspect (e.g. mobile computing device electronic data) of bank customer 412, where the first identifying aspect and the second identifying aspect are different from each other. In such embodiments, first sensor 410 and second sensor 420 may together provide redundant verification of the bank customer 412 that may help to ensure accurate and timely detection.

Also shown in FIG. 4 is bank representative 424 and bank computing device 426. Bank computing device 426 may be substantially similar to computing device 138 shown in FIG. 1. Namely, a method in accordance with this disclosure such as method 200 of FIG. 2 or method 300 of FIG. 3 may be performed by bank computing device 426. As shown in FIG. 4, bank computing device 426 may also include a cash drawer or other banking features.

In some embodiments, bank computing device 426 may perform additional steps of sending an in-bank prompt to bank representative 424. Similar to how process 300 may include sending customer service output 326 to the bank customer, bank computing device 426 may also send one or more electronic messages to a bank representative 424 that would enable bank representative 424 to take one or more actions to deliver enhanced customer service to the bank customer 412. In one embodiment, in-bank prompt may include data that enables bank representative 424 to continue a pending bank transaction that was previously initiated by the bank customer 412. In a second embodiment, the in-bank prompt may include data that enables bank representative 424 to initiate a new banking transaction that corresponds to a previously failed banking transaction that had previously been initiated by the bank customer 412. In a third embodiment, the in-bank prompt may include data that enables bank representative 424 to initiate a new banking transaction that corresponds to a pattern of previous reoccurring banking transactions associated with the bank customer 412.

As discussed above with respect to FIG. 3, these three embodiments of the in-bank prompt may correspond to the selected banking transaction in the check-in input 322 being the same type of corresponding identified preferred banking transaction, as identified from the customer transaction history in step 314. The in-bank prompt therefore may enable communication not only to the bank customer 412, but also communication to the bank representative 424 to take an action to complete the one or more selected banking transactions.

The in-bank prompt may direct the bank representative 424 to take actions such as, for example: preparing a cash withdrawal, retrieving a notary stamp, fetching previously signed paper documents, retrieve automatically printed documents relevant to the customer from a local printer, prepare a conference room for use by loading electronic documents or dialing into a conference call, or many others. In this way, bank representative 424 may begin to take action on behalf of bank customer 412 before even speaking to bank customer 412—as system 100 has detected bank customer 412 and communicated with bank customer 412 to automatically anticipate and receive the bank customer's banking transaction needs.

Figure 5:
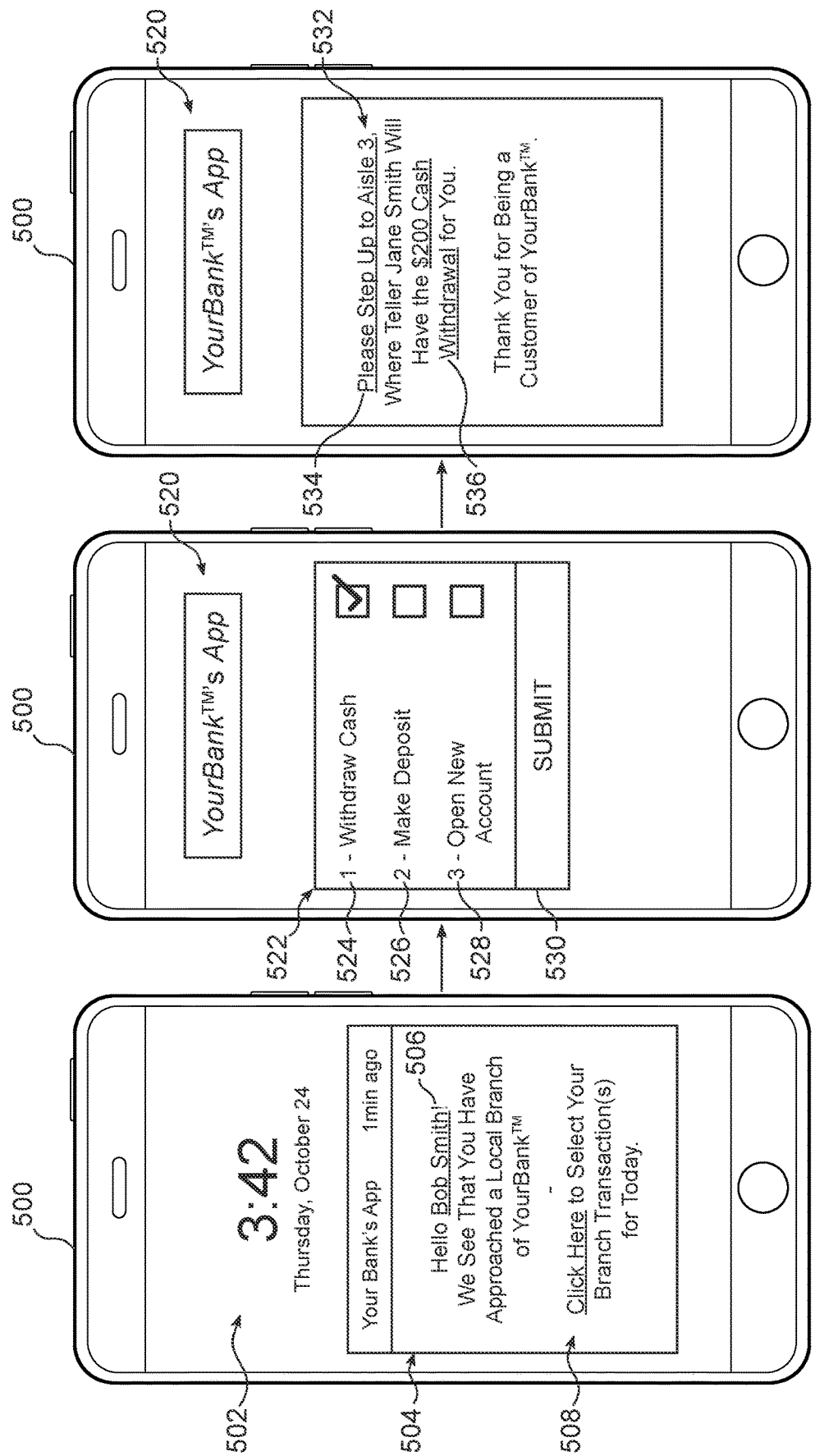
FIG. 5 shows diagrams of a first mobile computing device in accordance with this disclosure.
Figure 6:
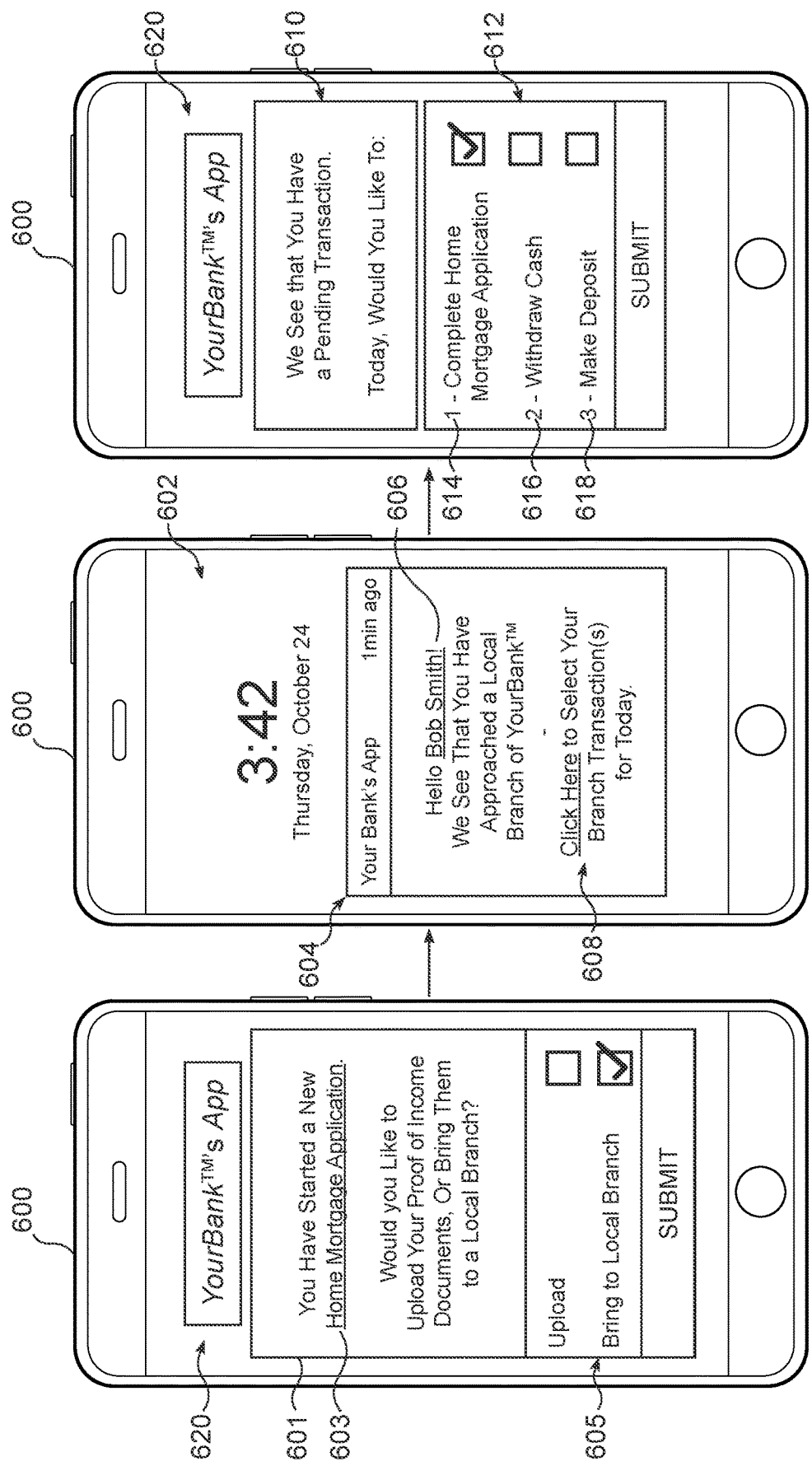
FIG. 6 shows diagrams of a second mobile computing device in accordance with this disclosure.
Figure 7:
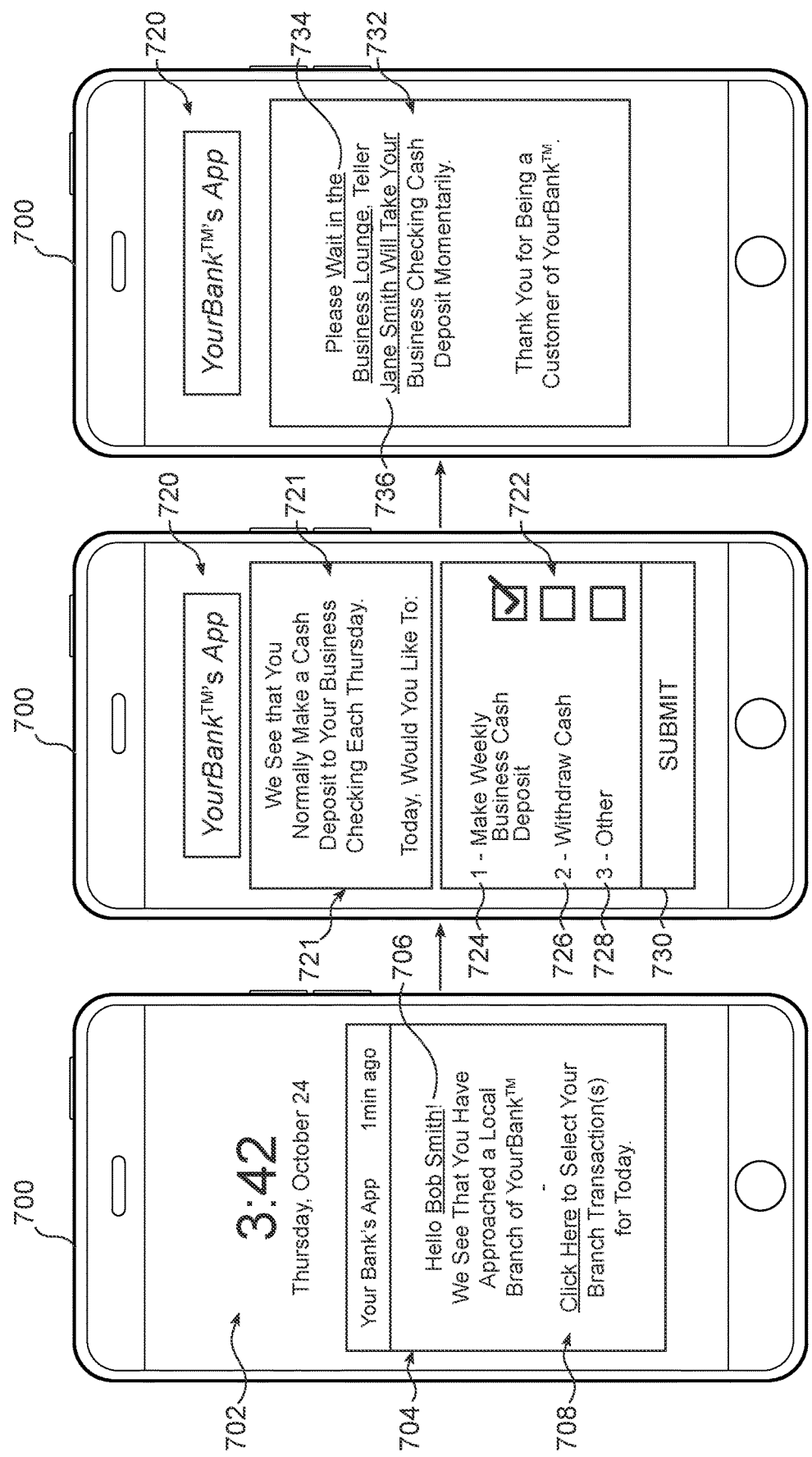
FIG. 7 shows diagrams of a third mobile computing device in accordance with this disclosure.

FIGS. 5 through 7 show embodiments of several mobile computing devices in accordance with this disclosure. Generally, a mobile computing device may be configured to execute one or more of the process steps shown in FIG. 2 or FIG. 3, instead of (or in conjunction with) computing device 138. In particular, a mobile computing device may be configured to send identifying electronic information to a sensor that is located within a geographic vicinity of a bank branch. As discussed above, the identifying electronic information may be associated with a bank customer who owns (or is otherwise associated with) the mobile computing device that is sending the identifying electronic information.

In particular embodiments, the mobile computing device and the sensor may both be configured such that the mobile computing device sends the identifying electronic information directly to the sensor through one or more wireless communication protocols such as near field communication, Bluetooth, and Wi-Fi. The mobile computing device may thus communicate directly with the sensor by sending electromagnetic data directly between the two, without the use of an intervening cellular network or other type of data network.

A mobile computing device in accordance with this disclosure may also be configured to access a customer profile database, such as customer profile database 142. The mobile computing device may do so in order to store an association between the mobile computing device and a customer profile in the customer profile database. This information may allow system 100 to communicate with the bank customer, as described above. Namely, computing device 138 may retrieve the association between the mobile computing device and the customer profile that the mobile computing device stored in the customer profile database 142 in order to send the check-in prompt 318 and customer service output 326 to said mobile computing device.

Furthermore, the mobile computing device may also be configured to authorize the sensor to receive the identifying electronic information from the mobile computing device—and store this authorization in the customer profile database 142 as associated with the customer profile. This may thereby allow authorization of a sensor 130 to receive potentially sensitive identifying information from the mobile computing device. In this way, the mobile computing device may properly authenticate and authorize system 100 to ensure that the mobile computing device only sends information to devices authorized by the customer to receive it.

In a first embodiment of a mobile computing device shown in FIG. 5, mobile computing device 500 is configured to receive a push notification 504 that displays on the mobile computing device's 500 home screen 502. This push notification may include an identity prompt 506 that verifies the identity of the bank customer associated with the mobile computing device 500. Push notification 504 including identity prompt 506 may be received in response to an interaction between an electronic sensor 134 and mobile computing device 500. Alternatively, in certain other embodiments, system 100 may include a first sensor and a second sensor as discussed above. In these embodiments, system 100 may detect a bank customer through customer visual aspects 104 and first sensor 410 as shown in FIG. 4 and then send identity prompt 506 to mobile computing device 500 in order to verify the identity of the bank customer. In these embodiments, mobile computing device 500 may send identifying electronic information to the sensor in response to the identity prompt—as a type of "two-factor" authentication of the bank customer through both a first sensor (132 or 410) and a second sensor (134 or 420).

Push notification 504 may include an option 508 to open the bank's mobile computing device application 520 to proceed with the transaction. Once the bank's app 520 is open, the mobile computing device 500 may receive a check-in prompt 522. The check-in prompt 522 may be descriptive of one or more available banking transactions 524, 526, 528 that are available to the bank customer. In response, the customer may select one or more available banking transactions 524, 526, 528 and generate a check-in output 530 that may be communicated back to system 100. Check-in output 530 may be communicated by mobile computing device 500 to system 100, that includes computing device 138, either directly via sensor 130 or via a network such as a cellular network.

Next, mobile computing device 500 would then receive a customer service input 532. Customer service input 532 may include data associated with an action 534 to be taken by at least one of the bank customer and the bank in order to complete the one or more selected banking transactions 536. As shown in FIG. 5, mobile computing device 500 may be configured to receive the check-in prompt as a push notification. In other embodiments, mobile computing device 500 may use other mobile computing device communication protocols to communicate with system 100, such as: SMS, push notifications, and in-app text based communication displays.

FIG. 6 shows another embodiment of a mobile computing device 600. Mobile computing device 600 may be configured to initiate a new banking transaction 603 inside of a bank mobile computing device app 620. Mobile computing device 600 may then be configured to partially complete 605 the new banking transaction 603, such that the new banking transaction 603 becomes a pending banking transaction. The pending banking transaction may be stored in customer transaction history database 140, which mobile computing device 600 may be in electronic communication with via a cellular network. In this way, a customer may start a transaction on their mobile computing device to be completed at a later time.

Subsequently, a bank customer may travel to a bank branch in order to complete the pending banking transaction. As with the embodiment shown in FIG. 5, FIG. 6 also shows a push notification 604 that includes an identity prompt 606 and the ability to open the bank's app directly 608 to continue. In this embodiment, however, the check-in prompt 610 may automatically include data associated with the pending banking transaction 614 that was previously started on the mobile computing device 600. Check-in prompt 610 may therefore be descriptive of the pending banking transaction 614, but may also be descriptive of one or more other available banking transactions 616, 618. Mobile computing device may then be configured to send a check-in output 612 in response to the check-in prompt 610, where the check-in output 612 may include data descriptive of one or more selected banking transactions 614.

In embodiments where the selected banking transactions 614 include a transaction corresponding to the pending banking transaction 603 that was previously initiated, then the customer service input (not shown in FIG. 6) may include data associated with one or more actions to be taken by at least one of the bank customer and the bank in order to complete the pending banking transaction 603. Accordingly, this may be useful for transactions that, for example, require a bank representative to provide guidance to the customer, or transactions requiring copies of third-party documents (such as pay stubs) that a bank customer must submit to the bank for a loan approval.

In another embodiment similar to as is shown in FIG. 6, a mobile computing device in accordance with this disclosure may send an appointment scheduling output. An appointment scheduling output may be sent as part of initiating a new transaction to be completed at the bank branch 603. In these embodiments, the appointment scheduling output may include data descriptive of a future time, a location corresponding to a bank branch, and a preferred banking transaction to be completed at the time of the appointment. Alternatively, in another embodiment, an appointment scheduling output may include only data descriptive of a future time and a location corresponding to a bank branch. An appointment scheduling output may be sent from the mobile computing device to one or more pieces of hardware associated with a bank, via a cellular network at a long distance from the bank branch. Generally, in this way, a bank customer may schedule an appointment with a bank customer service representative to conduct a preferred banking transaction and then a system or method in accordance with this disclosure may detect the customer's physical presence at the bank branch when they arrive.

FIG. 7 shows a third embodiment of a mobile computing device 700. In this embodiment, mobile computing device 700 may be configured to access a customer transaction history database 140. Mobile computing device 700 may then recall customer transaction history data associated with a customer profile in the customer transaction history database 140. From this, mobile computing device may then identify a preferred banking transaction from among a plurality of available banking transaction. The preferred banking transaction may be a transaction that is most likely to address the customer's reasons for visiting the bank branch at the particular time and place detected by a sensor. As discussed above, in some embodiments, a preferred banking transaction may be identified based on one or more of: a pending transaction (see above discussion regarding FIG. 6), a previously failed transaction, and a pattern of transactions over time.

FIG. 7 in particular shows the embodiment where a preferred banking transaction corresponds to a pattern of transactions over time. Namely, mobile computing device 700 receives a push notification 704 that displays on a home screen 702, and includes an identity prompt 706 and the ability to open the bank's app 720. In this embodiment, check-in prompt (721, 722) therefore includes data descriptive of the preferred banking transaction 724. As with other embodiments, the check-in prompt may also include additional available banking transactions 726, 728. Mobile computing device 700 may then send a check-in output 730 in response to the check-in prompt (721, 722).

As with other embodiments, FIG. 7 then shows how mobile computing device 700 may receive customer service input 732 that may include data associated with an action to be taken by the bank customer 734 and an action to be taken by the bank 736.

As a result of the above, the presently disclosed system, methods, and mobile computing device allows a bank to conveniently detect and communicate with one of its bank customers. The bank customer receives enhanced customer service that anticipates their needs and provides guidance to them, before they even have to talk to an in-person bank customer service representative.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for delivering enhanced customer service by detecting the physical proximity of a bank customer, comprising:
   a sensor; and
   at least one computing device, the computing device including a processor and being in electronic communication with the sensor;
   wherein the computing device is configured to perform the steps of:
      receiving a customer proximity input from the sensor, the customer proximity input including data descriptive of a physical presence of a customer who is located in a geographic proximity of a bank;
      comparing the customer proximity input to a customer profile database to identify a customer profile associated with the customer;
      sending a check-in prompt to the customer; the check-in prompt being descriptive of one or more available banking transactions that are available to the customer;
      receiving a check-in input from the customer, the check-in input including data descriptive of one or more selected banking transactions selected by the customer in response to the check-in prompt; and
      sending a customer service output to the customer, the customer service output including data associated with an action to be taken by at least one of the customer and the bank in order to complete the one or more selected banking transactions.

2. The system of claim 1, wherein the sensor is physically located within a geographic vicinity of the bank.

3. The system of claim 1, wherein the sensor comprises a camera configured to identify one or more physical features associated with the customer by capturing image data.

4. The system of claim 1, wherein the sensor comprises an electronic sensor configured to receive one or more types of identifying electronic data associated with the customer.

5. The system of claim 1, wherein the computing device is configured to:
   send the check-in prompt to a mobile computing device associated with the customer, wherein an association between the customer and the mobile computing device is described in the customer database;
   receive the check-in input from the mobile computing device associated with the customer; and
   send the customer service output to the mobile computing device associated with the customer.

6. The system of claim 1, wherein the computing device is further configured to:
   query a customer transaction history database by comparing the customer profile to the customer transaction history database;
   recall customer transaction history data associated with the customer profile in the customer history database;
   identify a preferred banking transaction among a plurality of available banking transactions that is likely to address the customer's reasons for visiting the bank, the preferred banking transaction being identified based on one or more of: a pending transaction, a previously failed transaction, and a pattern of transactions over time, as included in the customer transaction history data; and
   sending the check-in prompt to the customer, wherein the check-in prompt includes data descriptive of the preferred banking transaction.

7. A method comprising:
   detecting a physical presence of a bank customer who is located within a geographic region of a bank through an interaction between a sensor and an identifying aspect associated with the bank customer;

identifying a customer profile associated with the bank customer in a customer profile database, based on data received from the sensor;

querying a customer transaction history database by comparing the customer profile to the customer transaction history database;

recalling customer transaction history data associated with the customer profile from the customer transaction history database;

identifying a preferred banking transaction among a plurality of available banking transactions, the preferred banking transaction being an available banking transaction that is likely to address the bank customer's reasons for visiting the bank, wherein the preferred banking transaction is identified based on the customer transaction history data including one or more of a pending transaction, a previously failed transaction, and a pattern of previous transactions over time;

sending a check-in prompt to the bank customer; the check-in prompt including data descriptive of the preferred banking transaction;

receiving a check-in input from the bank customer in response to the check-in prompt, the check-in input including data descriptive of a selected banking transaction;

the selected banking transaction being at least one of the preferred banking transaction and other available banking transactions; and sending a customer service output to the bank customer, the customer service output including data associated with an action to be taken by at least one of the bank customer and a bank representative in order to complete the selected banking transaction.

8. The method of claim 7, wherein the method further includes a step of:

sending an in-bank prompt to the bank representative, the in-bank prompt including data that enables the bank representative to continue a pending banking transaction previously initiated by the bank customer.

9. The method of claim 7, wherein the method further includes a step of:

sending an in-bank prompt to the bank representative, the in-bank prompt including data that enables the bank representative to initiate a new banking transaction that corresponds to a previously failed banking transaction that had previously been initiated by the bank customer.

10. The method of claim 7, wherein the method further includes a step of:

sending an in-bank prompt to the bank representative, the in-bank prompt including data that enables the bank representative to initiate a new banking transaction that corresponds to a pattern of previous reoccurring banking transactions associated with the bank customer.

11. The method of claim 7, wherein:

the sensor is selected from the group consisting of: an active RFID sensor, a passive RFID sensor, a near-field communication sensor, a Bluetooth sensor, a Wi-Fi hotspot, a biometric scanner, a facial recognition scanner, and a license plate scanner.

12. The method of claim 7, wherein the method further comprises:

a first sensor and a second sensor, wherein the first sensor interacts with a first identifying aspect of the bank customer, the second sensor interacts with a second identifying aspect of the bank customer, and the first identifying aspect and the second identifying aspect are different from each other.

13. The method of claim 7, wherein:

the identifying aspect associated with the bank customer is a mobile computing device;

the step of sending a check-in prompt to the bank customer includes sending the check-in prompt to the mobile computing device;

the step of receiving a check-in input from the customer includes receiving the check-in input from the mobile computing device;

the step of sending a customer service output to the bank customer includes sending the customer service output to the mobile computing device.

* * * * *